(12) United States Patent
Benner et al.

(10) Patent No.: US 9,311,385 B2
(45) Date of Patent: Apr. 12, 2016

(54) INDICATING LEVEL OF CONFIDENCE IN DIGITAL CONTENT

(71) Applicant: International Business Machines Corporation, Armonk, NY (US)

(72) Inventors: Alan F. Benner, Poughkeepsie, NY (US); Bilicon Patil, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/501,268

(22) Filed: Sep. 30, 2014

(65) Prior Publication Data

US 2015/0058360 A1  Feb. 26, 2015

Related U.S. Application Data

(63) Continuation of application No. 13/741,962, filed on Jan. 15, 2013.

(51) Int. Cl.
*G06F 17/30* (2006.01)
*G06Q 10/10* (2012.01)
*G06Q 30/02* (2012.01)

(52) U.S. Cl.
CPC .......... *G06F 17/30595* (2013.01); *G06Q 10/10* (2013.01); *G06Q 30/0278* (2013.01)

(58) Field of Classification Search
CPC .................................................. G06F 17/3053
USPC ........................................................ 707/748
See application file for complete search history.

(56) References Cited

U.S. PATENT DOCUMENTS

| 6,418,549 | B1 | 7/2002 | Ramchandran et al. |
| 7,412,475 | B1 | 8/2008 | Govindarajalu |
| 8,023,738 | B1 * | 9/2011 | Goodwin ........... G06K 9/00469 382/175 |
| 8,566,329 | B1 | 10/2013 | Freed et al. |
| 2005/0283834 | A1 * | 12/2005 | Hall ....................... G06F 21/577 726/24 |
| 2005/0289179 | A1 * | 12/2005 | Naphade .............. G06K 9/6292 |
| 2006/0015944 | A1 | 1/2006 | Fields |
| 2006/0020919 | A1 | 1/2006 | King |
| 2007/0198506 | A1 | 8/2007 | Attaran Rezaei et al. |
| 2007/0237428 | A1 * | 10/2007 | Goodwin ........... G06K 9/00442 382/309 |
| 2009/0138843 | A1 * | 5/2009 | Hinton ...................... G06F 8/74 717/101 |
| 2009/0177635 | A1 * | 7/2009 | Koohgoli ................ G06F 21/10 |
| 2009/0281995 | A1 | 11/2009 | Mousavi et al. |
| 2012/0047103 | A1 * | 2/2012 | Marecki .................. G06Q 10/10 706/52 |
| 2012/0219187 | A1 * | 8/2012 | Boncyk ............. G06F 17/30256 382/103 |
| 2013/0191401 | A1 | 7/2013 | Xia et al. |
| 2013/0340076 | A1 | 12/2013 | Cecchetti et al. |

* cited by examiner

*Primary Examiner* — Noosha Arjomandi
(74) *Attorney, Agent, or Firm* — Cantor Colburn LLP; Steven Chiu

(57) ABSTRACT

Rating content of a digital file includes analyzing, by a computer, data associated with content of the digital file based on predetermined criteria defining a confidence level in the content of the digital file. Each predetermined criterion includes a range of values and at least one threshold delineating a lower confidence level and a higher confidence level. Different confidence ratings are assigned to different segments of the content based on determining that the different segments correspond to different thresholds of the predetermined criteria. The computer associates the different confidence ratings to the different segments.

13 Claims, 7 Drawing Sheets

INDICATING LEVEL OF CONFIDENCE IN DIGITAL CONTENT

DOMESTIC PRIORITY

This application is a continuation of U.S. patent application Ser. No. 13/741,962, filed Jan. 15, 2013, the disclosure of which is incorporated by reference herein in its entirety.

BACKGROUND

The present invention relates generally to a system and method for providing an indication of a confidence level in digital content, and more specifically, to analyzing digital content of a digital file based on predetermined criteria and providing indications of a confidence level in different segments of the content based on the predetermined criteria.

Source code, word processing documents, computer-assisted design files and other digital files may be created by multiple authors or contributors. The different contributors may have varying levels of experience and may have varying levels of alertness when contributing content to the digital file. In addition, content within a digital file may have varying levels of complexity.

Digital files may be tagged with a date and time at which the file was last modified and a version number. However, while these may provide information regarding the readiness of the entire digital file for its purpose, these do not help a person reviewing the digital file to identify particular areas that may require a more thorough review. Accordingly, the contributor or another reviewer may spend more time than is necessary reviewing content that is mature and error-free, or the reviewer may spend less time than is necessary to catch errors in sections of the digital file prepared by a contributor with less experience or including complex content.

SUMMARY

Embodiments include a method, system, and computer program product for rating the confidence level or reliability of content of a digital file based on data associated with the creation or modification of the content.

Embodiments of the disclosure relate to a computer-implemented method for rating content of a digital file including analyzing, by a computer, data associated with content of the digital file based on predetermined criteria defining a confidence level in the content of the digital file. Each predetermined criterion may include a range of values and at least one threshold delineating a lower confidence level and a higher confidence level. The method includes assigning a different confidence rating to different segments of the content based on determining that the different segments correspond to different thresholds of the predetermined criteria. The method further includes associating, by the computer, the different confidence ratings to the different segments.

Embodiments further relate to a computer program product for rating content of a digital file. The computer program product includes a tangible storage medium readable by a processing circuit and storing instructions for execution by the processing circuit for performing a method. The method includes analyzing, by the processing circuit, data associated with segments of content of the digital file based on predetermined criteria defining a confidence level in the content of the digital file. Each predetermined criterion includes a range of values and at least one threshold delineating a lower confidence level and a higher confidence level. The method includes assigning a different confidence rating to different segments of the content based on determining that the different segments correspond to different thresholds of the predetermined criteria. The method further includes associating, by the processing circuit, the different confidence ratings to the different segments.

Embodiments of the disclosure further relate to a computer system for rating content of a digital file. The system includes memory having stored therein the digital file, predetermined criteria defining a confidence level of content of the digital file, each predetermined criterion comprising a range of values and at least one threshold delineating a lower confidence level and a higher confidence level, and a computer program configured to analyze the content of the digital file to determine a confidence level of the content. The computer system further includes a processor configured to execute the computer program to analyze data associated with segments of content of the digital file based on the predetermined criteria, to assign a different confidence rating to different segments of the content based on determining that the different segments correspond to different thresholds of the predetermined criteria, and to associate the different confidence ratings to the different segments.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Digital content, such as source code, word processing content and computer-assisted design content may allow multiple users to contribute to the creation of a single digital file. In addition a quality of work performed by each user may vary. Embodiments of the disclosure analyze content in a digital file based on predetermined criteria that correspond to a confidence level in the content and rate different segments of the content with different levels of confidence.

Figure 1:
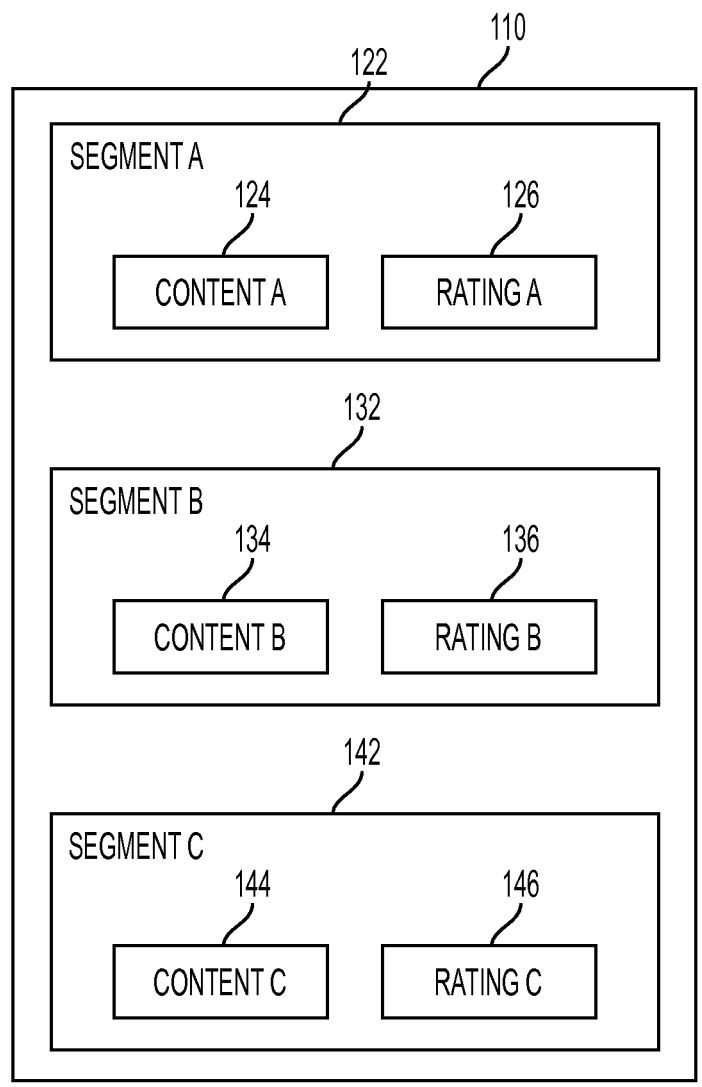
FIG. 1 depicts a digital file in accordance with one embodiment.

FIG. 1 is a block diagram representing a digital file 110 according to one embodiment. The digital file 110 includes different segments of data 122, 132 and 142 (segment A, segment B and segment C) having different characteristics. Each segment 122, 132 and 142 may be of any size. In embodiments in which the digital file comprises text, such as source code or a word processing document, each segment may have a size as small as one word of text and as large as the entire digital file 110. In the example illustrated in FIG. 1, however, the digital file 110 includes three separate segments 122, 132 and 142.

The content that makes up the digital file 110 is divided into the segments 122, 132 and 142 based on comparing the content of the digital file 110 with predetermined criteria and determining that the different segments 122, 132 and 142 correspond to different thresholds of the predetermined criteria. The predetermined criteria may include temporal criteria corresponding to when the content of the digital file was created or modified. The predetermined criteria may also include biographical criteria corresponding to an identity of an author of, or contributor to, the content of the digital file 110. The predetermined criteria may also include an inherent characteristic of the content of the digital file 110.

As examples of temporal criteria, the predetermined criteria may include a time that the content was created or modified and a period of time that the author of, or contributor to, the content was working on the digital file prior to creating or modifying the content. However, embodiments encompass any type of temporal criteria, and in particular temporal criteria that may be associated with a reliability of the content or a confidence level that the content is error-free.

As examples of biographical criteria, the predetermined criteria may include an experience level of the author or contributor, an alertness of the author or contributor, previous work of the author or contributor, user-entered confidence levels, such as the author or contributor's confidence in their own work or a supervisor's confidence in the author or contributor's work. However, embodiments encompass any type of biographical criteria, and in particular biographical criteria that may be associated with a reliability of the content or a confidence level that the content is error-free.

As examples of inherent data of the content, the predetermined criteria may include a complexity level of the content, previous uses of the content in other digital files, and data regarding whether the content was previously checked or reviewed. However, embodiments encompass any type of inherent data criteria, and in particular inherent data criteria that may be associated with a reliability of the content or a confidence level that the content is error-free.

In embodiments of the present disclosure, the predetermined criteria may include a range of values and predetermined thresholds may be provided to determine confidence ratings for different segments of the content. Content having confidence levels determined to be on one side of a threshold may have a different confidence rating assigned to the content than the content that is determined to be on an opposite side of the threshold.

For example, when the predetermined criteria include a time of day that the author or contributor created or modified a segment of content, a first threshold may be "between 8:01 am and 6:00 pm," a second threshold may be "between 6:01 pm and 10:00 pm" and a third threshold may be "between 10:01 pm and 8:00 am." The content that is created between 8:01 am and 6:00 pm may be designated with a confidence rating of "high-confidence," content that is created between 6:01 pm and 10:00 pm may be designated with a confidence rating of "medium confidence," and content that is created between 10:01 pm and 8:00 am may be designated with a confidence rating of "low confidence." The association of a confidence rating with a range of times may be pre-set or pre-designed to correspond to an alertness level of the author of the content. In other words, it may be assumed that the author is less alert at midnight than at 10:00 am, and so the content created at midnight is more likely to have errors or require review than the content created at 10:00 am. Accordingly, a segment of content including content created between 10:01 pm and 8:00 am is given a "low confidence" rating, while the content created between 8:01 am and 6:00 pm is given a "high confidence" rating.

As illustrated in FIG. 1, the digital file 110 includes the segments 122, 132 and 142 including content 124, 134 and 144. The digital file 110 also includes rating indicators 126, 136 and 146 corresponding to the content 124, 134 and 144. The rating indicators 126, 136 and 146 are different based on the different characteristics of the different segments 122, 132 and 142. In other words, when compared with predetermined criteria associated with a confidence level of content, the content 124 of the first segment 122 is determined to be associated with confidence levels in a range that is entirely on one side of a threshold confidence level, and the content 134 of the segment 132 is determined to be associated with confidence levels in a range that is entirely on the opposite side of the threshold confidence level.

In embodiments of the present disclosure, the content of a digital file 110 is analyzed and different confidence ratings 126, 136 and 146 are assigned to different segments 122, 132 and 142 based on characteristics of the different segments 122, 132 and 142, and in particular based on comparing the characteristics of the different segments 122, 132 and 142 with predetermined criteria associated with a confidence level of content.

Figure 2:
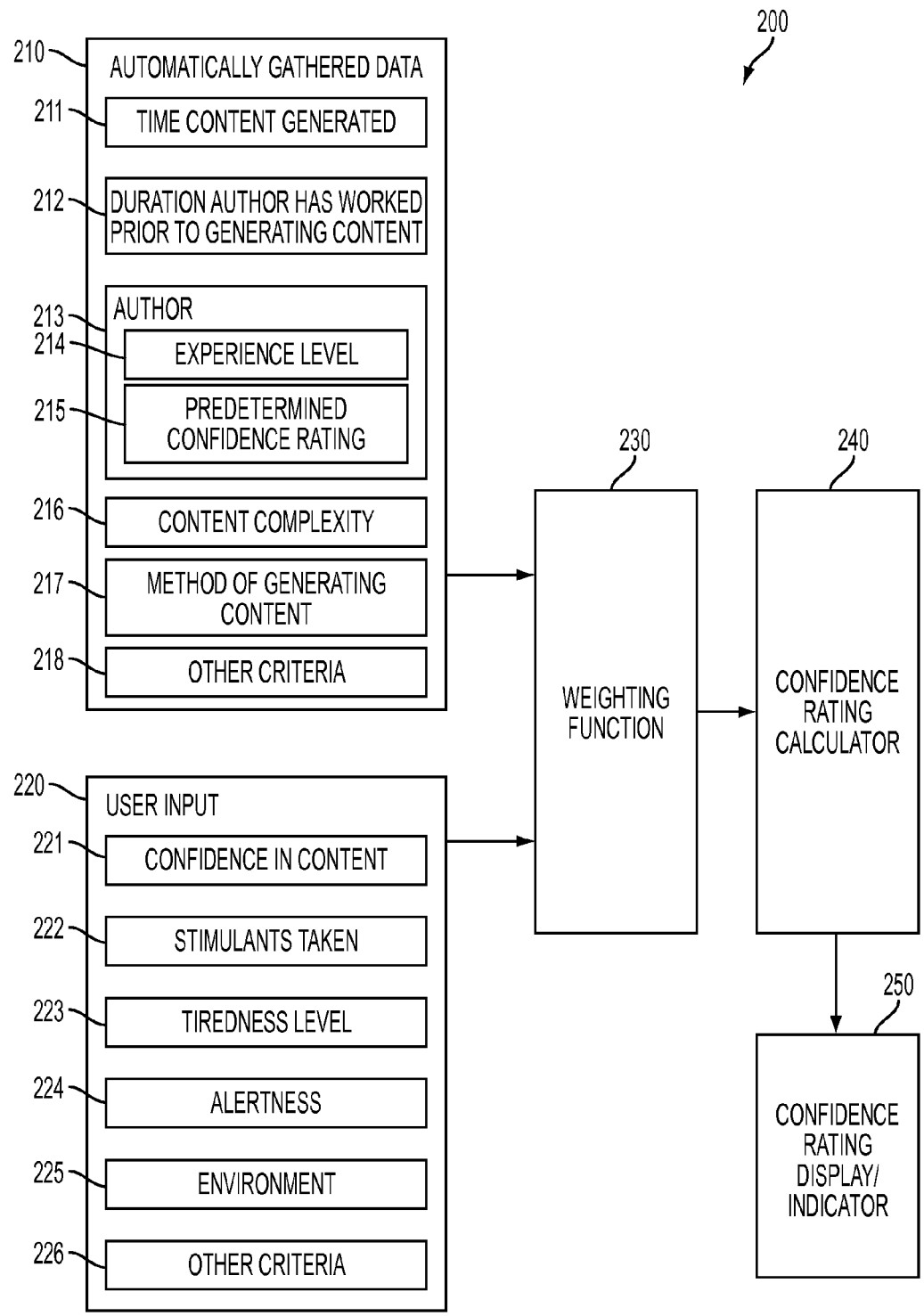
FIG. 2 depicts a process flow for rating content according to one embodiment.

FIG. 2 illustrates a process 200 of assigning a confidence rating to a segment of content according to one embodiment. The confidence rating for content of a digital file may be assigned based on automatically gathered data 210 and user-input data 220. Automatically-gathered data 210 is data that a computer system or a processor running a computer program gathers from the content, from data associated with the content or from other sources without requiring a user to input the data. User-input data 220 is data that is input by a user when the content is created or modified. For example, the author or contributor of content to the digital file may enter data regarding biological or environmental information that may have a bearing on the alertness of the author or contributor when the content is created or modified.

As illustrated in FIG. 2, examples of automatically-gathered data 210 include a time 211 that content was generated or modified, a duration 212 that an author or contributor worked in the digital file or other files on the same computer prior to generating or modifying the content-in-question, and biographical information 213 about the author or contributor that is stored in a computer system and does not require user input. Examples of stored biographical information 213 may include an experience level 214 of the author or contributor and a predetermined or pre-assigned confidence rating 215 associated with the author or contributor.

Another example of automatically-gathered data 210 is a complexity of the content 216. The complexity of the content 216 may be determined based on pre-stored algorithms, based on pre-stored user input (i.e., prior to the creation of the digital file being analyzed), or based on any pre-stored or pre-calculated data. Yet another example of automatically-gathered data 210 includes a manner in which the content is generated 217. For example, since errors in source code often arise when contributors copy and paste code from other sources, content that has been copied and pasted into a file may be given a lower confidence level than content generated by the contributor without cutting and pasting from another file. Although some examples of automatically-gathered data 210 are provided by way of example and description, it is understood that embodiments of the disclosure encompass any other criteria 218 that are stored or automatically-gathered by a computer system, processor or program without requiring input by a user when creating or modifying the content of a digital file that is being analyzed.

Examples of user-input data 220 include a user's self-identified confidence 221 in the user's generated or modified content, a quantity of stimulants, such as energy pills, drinks or other consumables, taken 222 by the user, a tiredness level 223 of the user, an alertness level 224 of the user and an environment 225 of the user, such as a noisy environment, a quiet environment, a public environment or a private environment. While some examples of user-input data 220 are provided by way of example, any user-input data 220 including any other criteria 226 may be provided.

In one embodiment, the user's self-identified confidence 221 may be provided as a way for a contributor to flag content to have a reviewer review the content at a later time by giving the content a lower confidence rating. In addition, in one embodiment, a third party, such as a supervisor, reviewer or peer may manually-input data to alter a confidence rating of content. For example, if an employee leaves a company, a supervisor may lower a confidence level of content contributed by the employee for a given period of time before the employee's departure.

In one embodiment, when a user begins work on a digital file, such as when a programmer opens a screen to begin writing or modifying source code, a window or bar may appear to prompt the user to enter information regarding the user's confidence level or alertness. The same or another prompt may appear periodically while the user is working, a notifier icon may appear periodically to remind the user to input the confidence or reliability data, or a menu bar or window may be constantly on-screen, such as at a side of the screen. When a window is constantly at the side of the screen, the user can continually work, and can update the confidence or reliability data as needed while working, such as by clicking on an icon to change a status from "alert" to "tired," etc.

In one embodiment, the data regarding the content in the digital file, including any automatically-gathered data 210 and any user-input data 220, may be assigned a weight according to a weighting function 230. For example, in one embodiment automatically-gathered data 210 is assigned a higher weight than user-input data 220, or an experience level 214 of an author of content is assigned a higher weight than a determination of a duration 212 that the author worked in the digital file prior to generating the content-in-question.

In block 240, the data regarding the content of the digital file, including any automatically-gathered data 210 and any user-input data 220, or weighted values corresponding to the data associated with the content of the digital file, is used by a confidence rating calculator 240 to generate confidence ratings for different segments of the content of the digital file.

For example, the automatically-gathered data 210 and user-input data 220 may be assigned numerical values, weighted, combined by a predetermined algorithm (such as by averaging) and compared to predetermined thresholds. The content may be assigned confidence ratings according to where the numerical value associated with the content falls in relation to the thresholds.

For example, a programmer may begin working at 3:00 pm, which may have a numerical confidence level value of "1" corresponding to "very alert." However, the user may manually-input a confidence level of "not very confident," meaning the programmer may feel that the code being written is complex. The manually-entered confidence value may be assigned a numerical value of "0.3" associated with a rating of "not confident." An algorithm that combines the multiple confidence level inputs may be instructed to give a user input more weight when the user expresses a lack of confidence, based on an assumption of the quality-assurance team that a programmer that expresses a lack of confidence in the work is more likely to be giving an honest assessment than a programmer who expresses a high level of confidence in their work. Accordingly, the user-input value may be given a weight of (×0.9) and the automatically-gathered value may be given a weight of (×0.1). A resulting confidence level of the next ten lines of source code may be 0.185 ((0.9×0.3)+(1×0.1))/2. Threshold values for the confidence ratings may be set at 0.3 and 0.8. Accordingly, the ten lines of code written by the programmer may be designated as "low confidence," corresponding to confidence values in a range less than the lower threshold of 0.3.

However, the programmer may come to a set of code in which the programmer has a high degree of confidence. Accordingly, the programmer may adjust the self-entered confidence rating to "very high," which may have an associated confidence level of "0.9". Based on a pre-defined algorithm that takes into account the user-input confidence level and the automatically-gathered data (i.e., the time of day), the resulting confidence level of the next ten lines of code may be 0.95. Based on the pre-set threshold values of 0.3 and 0.8, these lines of code may be assigned a confidence level of "very high."

Each of the groups of code having different confidence levels may be visually divided into segments and each segment may be assigned a confidence rating based on the confidence levels associated with the lines of code. For example, all of the code having confidence levels in a range from 0.8 to 1 may be grouped together and given a confidence rating of "very high confidence."

In block 250, the content of the digital file may be displayed together with the confidence ratings of the different segments of the digital file. For example, one segment having a low confidence rating may be displayed in red text and another segment having a high confidence rating may be displayed in blue text. Colors are provided as examples of confidence rating indicators. However, any visual, audio or tactile indicator may be provided to indicate a confidence rating of a segment of content according to the hardware of the system in which the content rating of the segments of content are displayed.

Figure 3:
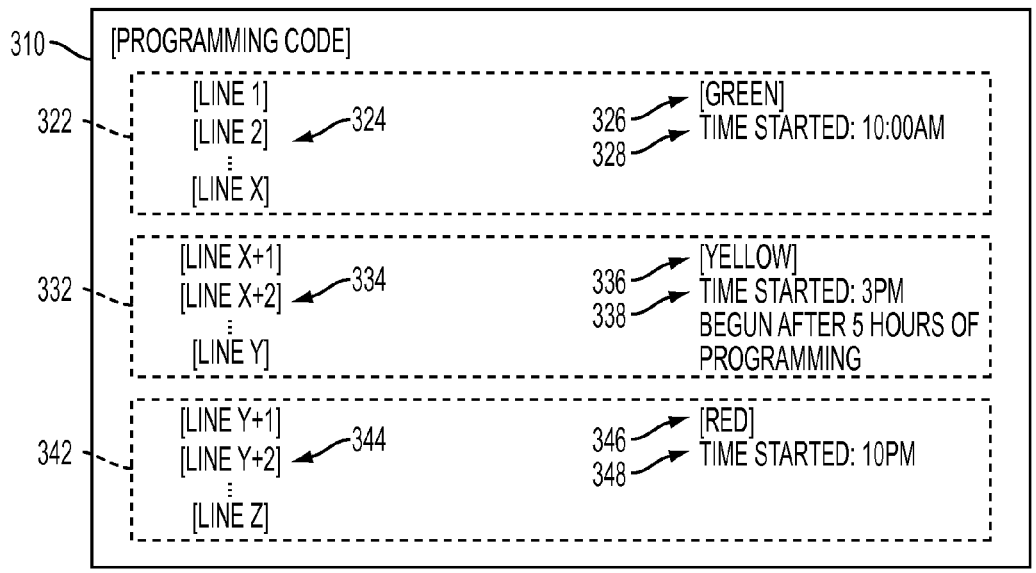
FIG. 3 depicts a display of content according to another embodiment.
Figure 4:
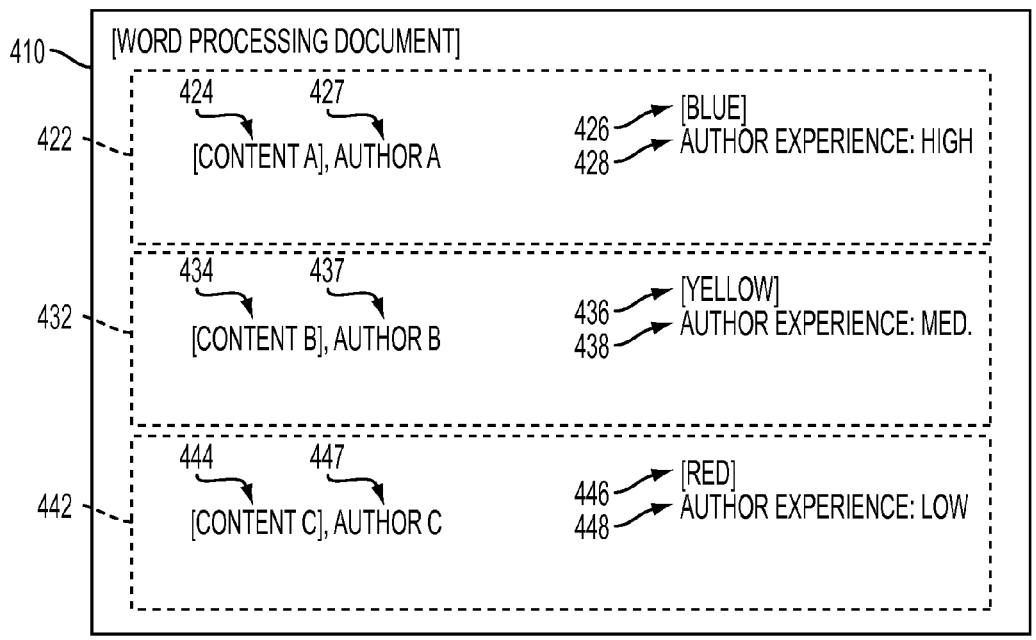
FIG. 4 depicts a display of content according to another embodiment.
Figure 5:
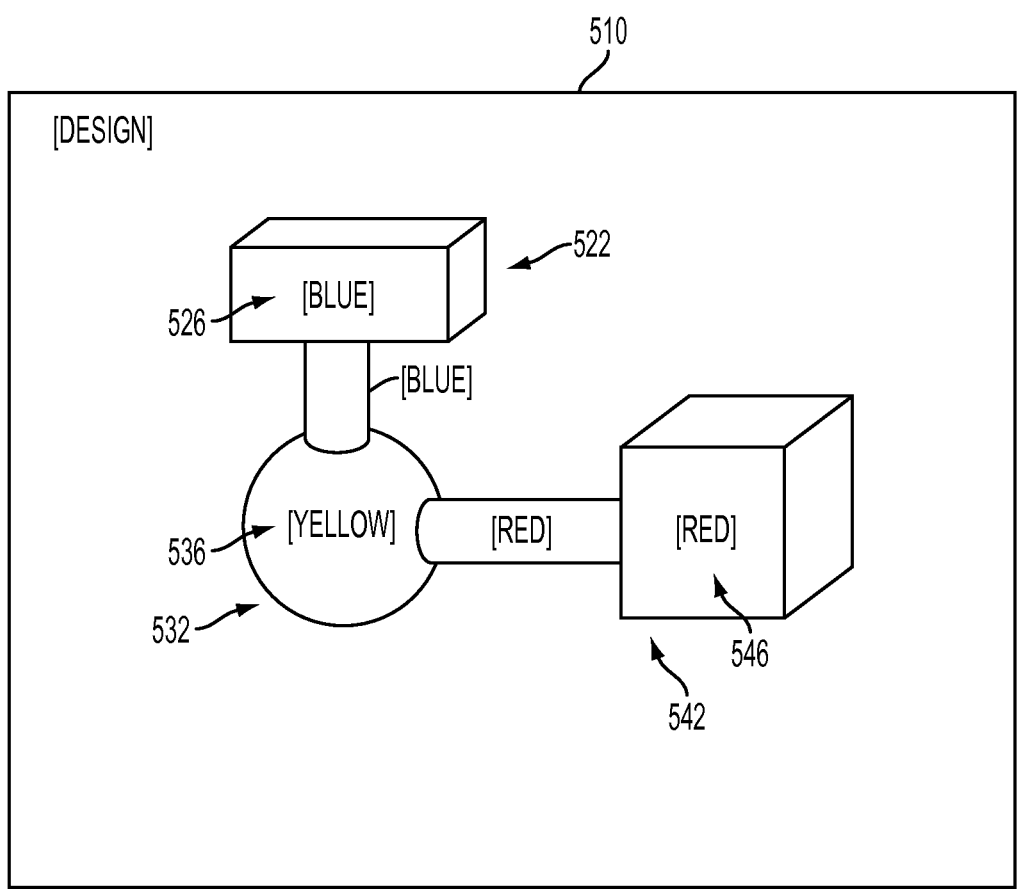
FIG. 5 depicts a display of content according to one embodiment.

FIGS. 3 through 5 illustrate examples of displaying the confidence ratings of different segments of content in a same digital file according to embodiments of the disclosure.

FIG. 3 illustrates a display 310 according to one embodiment. In FIG. 3, the digital file contains source code, such as an object oriented programming language such as Java, Smalltalk, C++ or the like and conventional procedural programming languages, such as the "C" programming language or similar programming languages. The programming code is displayed on the display 310 and includes segments 322, 332 and 342. The segments 322, 332 and 342 are made up of content 324, 334 and 344. Each segment 322, 332 and 342 is assigned a rating indicator 326, 336 and 346. In FIG. 3, the rating indicators are colors, green, yellow and red, respectively, but embodiments of the present disclosure encompass any type of rating indicator. As discussed above, the rating indicators 326, 336 and 346 for each segment are determined based on calculated confidence ratings of the segments 322, 332 and 342. The confidence ratings are calculated by comparing data associated with the content to predetermined criteria including predetermined thresholds indicating different confidence levels in the content.

In addition to the confidence ratings 326, 336 and 346, the segments 322, 332 and 342 may further include displays of data 328, 338 and 348 associated with the segments 322, 332 and 342, such as a time at which work on the segment was started and a time an author worked in the digital file prior to beginning work on the segment.

FIG. 4 illustrates a display 410 according to one embodiment. In FIG. 4, the digital file contains word processing content, defined as content made up of words, sentences and paragraphs and capable of being easily edited by a word processing program. The word processing content is displayed on the display 410 and includes segments 422, 432 and 442. The segments 422, 432 and 442 are made up of content 424, 434 and 444. Each segment 422, 432 and 442 is assigned a rating indicator 426, 436 and 446. In FIG. 4, the rating indicators are colors, blue, yellow and red, respectively, but embodiments of the present disclosure encompass any type of rating indicator. As discussed above, the rating indicators 426, 436 and 446 for each segment are determined based on calculated confidence ratings of the segments 422, 432 and 442. The confidence ratings are calculated by comparing data associated with the content to predetermined criteria including predetermined thresholds indicating different confidence levels in the content.

In addition to the confidence ratings 426, 436 and 446, the segments 422, 432 and 442 may further include displays of data 428, 438 and 448 associated with the segments 422, 432 and 442, such as an author experience level of the author 427, 437 and 447 who created or modified the content of the segments 422, 432 and 442.

FIG. 5 illustrates a display 510 according to one embodiment. In FIG. 5, the digital file contains graphical content, such as shapes or objects created in a presentation program, a computer-assisted design program or any other program utilizing shapes and non-word means of illustrating objects and structures. The graphical content is displayed on the display 510 and includes segments 522, 532 and 542. The segments 522, 532 and 542 correspond to graphical or design content, such as shapes, pictures or representations of objects. Each segment 522, 532 and 542 is assigned a rating indicator 526, 536 and 546. In FIG. 5, the rating indicators are colors, blue, yellow and red, respectively, but embodiments of the present disclosure encompass any type of rating indicator. As discussed above, the rating indicators 526, 536 and 546 for each segment are determined based on calculated confidence ratings of the segments 522, 532 and 542. The confidence ratings are calculated by comparing data associated with the content to predetermined criteria including predetermined thresholds indicating different confidence levels in the content.

Figure 6:
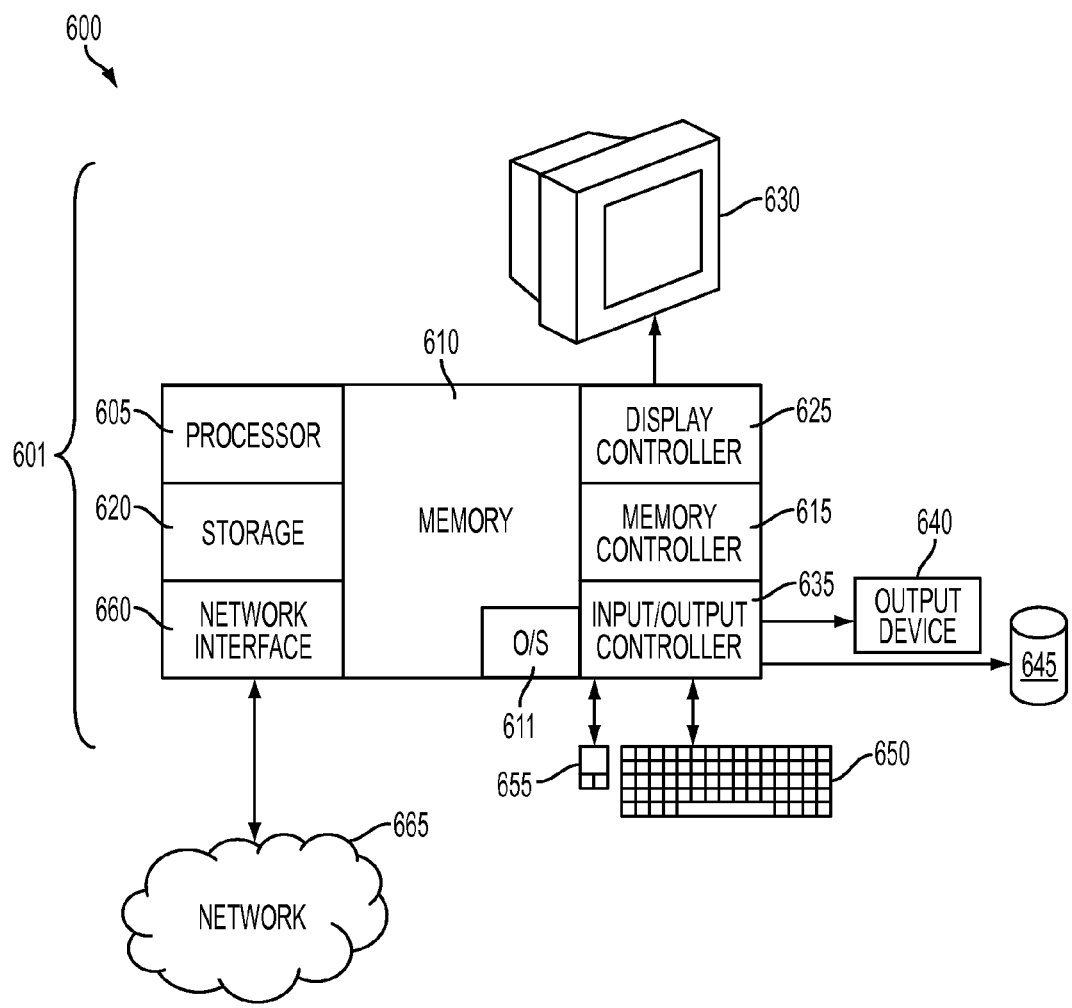
FIG. 6 depicts a computer system according to one embodiment.

FIG. 6 illustrates a block diagram of a computer system 600 according to an embodiment of the present disclosure. The methods described herein can be implemented in hardware, software (e.g., firmware), or a combination thereof. In an exemplary embodiment, the methods described herein are implemented in hardware as part of the microprocessor of a special or general-purpose digital computer, such as a personal computer, workstation, minicomputer, or mainframe computer. The system 600 therefore may include general-purpose computer or mainframe 601.

In an exemplary embodiment, in terms of hardware architecture, as shown in FIG. 6, the computer 601 includes a one or more processors 605, memory 610 coupled to a memory controller 615, and one or more input and/or output (I/O) devices 640, 645 (or peripherals) that are communicatively coupled via a local input/output controller 635. The input/output controller 635 can be, for example, one or more buses or other wired or wireless connections, as is known in the art. The input/output controller 635 may have additional elements, which are omitted for simplicity in description, such as controllers, buffers (caches), drivers, repeaters, and receivers, to enable communications. Further, the local interface may include address, control, and/or data connections to enable appropriate communications among the aforementioned components. The input/output controller 635 may access the output devices 640 and 645.

The processor 605 is a hardware device for executing software, particularly that stored in storage 620, such as cache storage, or memory 610. The processor 605 can be any custom made or commercially available processor, a central processing unit (CPU), an auxiliary processor among several processors associated with the computer 601, a semiconductor based microprocessor (in the form of a microchip or chip set), a macroprocessor, or generally any device for executing instructions.

The memory 610 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 610 may incorporate electronic, magnetic, optical, and/or other types of storage media. Note that the memory 610 can have a distributed architecture, where various components are situated remote from one another, but can be accessed by the processor 605.

The instructions in memory 610 may include one or more separate programs, each of which comprises an ordered listing of executable instructions for implementing logical functions. In the example of FIG. 6, the instructions in the memory 610 include a suitable operating system (O/S) 611. The operating system 611 essentially controls the execution of other computer programs and provides scheduling, input-output control, file and data management, memory management, and communication control and related services.

In an exemplary embodiment, a conventional keyboard 650 and mouse 655 can be coupled to the input/output controller 635. Other output devices such as the I/O devices 640, 645 may include input devices, for example, but not limited to a printer, a scanner, microphone, and the like. Finally, the I/O devices 640, 645 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 600 can further include a display controller 625 coupled to a display 630. In an exemplary embodiment, the system 600 can further include a network interface 660 for coupling to a network 665. The network 665 can be any type of network, such as an IP-based network for communication between the computer 601 and any external server, client and the like via a broadband connection, an optical fiber network, or any other type of network.

The network 665 transmits and receives data between the computer 601 and external systems. In an exemplary embodiment, network 665 can be a managed IP network administered by a service provider. The network 665 may be implemented in a wireless fashion, e.g., using wireless protocols and technologies, such as WiFi, WiMax, etc. The network 665 can also be a packet-switched network such as a local area network, wide area network, metropolitan area network, Internet network, or other similar type of network environment. The network 665 may be a fixed wireless network, a wireless local area network (LAN), a wireless wide area network (WAN) a personal area network (PAN), a virtual private network (VPN), intranet or other suitable network system and includes equipment for receiving and transmitting signals.

When the computer 601 is in operation, the processor 605 is configured to execute instructions stored within the memory 610, to communicate data to and from the memory 610, and to generally control operations of the computer 601 pursuant to the instructions.

In an exemplary embodiment, the methods of managing processes described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

In embodiments of the present disclosure, the content rating system may utilize hardware and software within the computer system 600, including memory 610 or output devices 640 and 645 for storing digital files including content, for storing predetermined criteria for rating the confidence level of the content of the digital files and for storing confidence ratings assigned to different segments of the digital file and associating the confidence ratings with the digital file based on analyzing the content of the digital file in view of the predetermined criteria. The processor 605 may perform the analysis of the content of the digital file, and the display controller 625 may control the display of the content, including any confidence indicators, such as a variation of a color in which the content is displayed, a shading or line variation of content, and a display of one or more letters, words, symbols representing a confidence rating.

Figure 7:
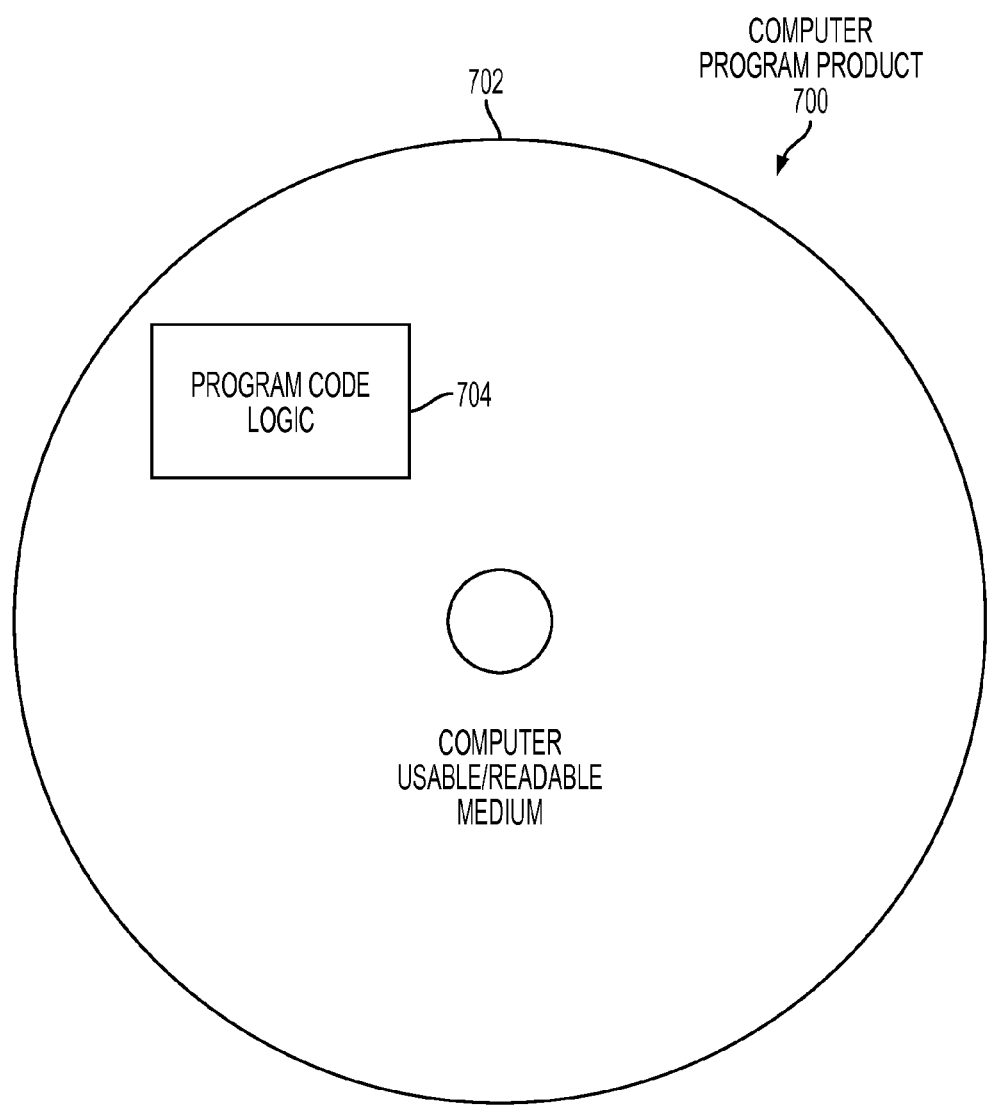
FIG. 7 illustrates a computer program product in accordance with an embodiment.

As described above, embodiments can be embodied in the form of computer-implemented processes and apparatuses for practicing those processes. An embodiment may include a computer program product 700 as depicted in FIG. 7 on a computer readable/usable medium 702 with computer program code logic 704 containing instructions embodied in tangible media as an article of manufacture. Exemplary articles of manufacture for computer readable/usable medium 702 may include floppy diskettes, CD-ROMs, hard drives, universal serial bus (USB) flash drives, or any other computer-readable storage medium, wherein, when the computer program code logic 704 is loaded into and executed by a computer, the computer becomes an apparatus for practicing the embodiments. Embodiments include computer program code logic 704, for example, whether stored in a storage medium, loaded into and/or executed by a computer, or transmitted over some transmission medium, such as over electrical wiring or cabling, through fiber optics, or via electromagnetic radiation, wherein, when the computer program code logic 704 is loaded into and executed by a computer, the computer becomes an apparatus for practicing the embodiments. When implemented on a general-purpose microprocessor, the computer program code logic 704 segments configure the microprocessor to create specific logic circuits.

As will be appreciated by one skilled in the art, one or more aspects of the present invention may be embodied as a system, method or computer program product. Accordingly, one or more aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, one or more aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 8:
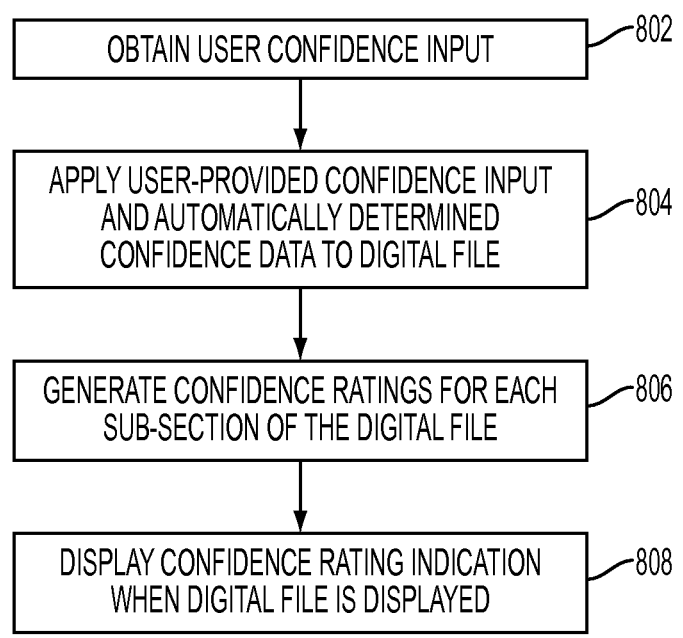
FIG. 8 illustrates a process flow for rating content according to an embodiment.

FIG. 8 illustrates a process flow of a method according to an embodiment of the disclosure. In block 802, user confidence input may be obtained. For example, as discussed above, a user may enter information about the user's alertness, environment, confidence in the user-generated content or any other input providing information regarding a reliability of content or a confidence in the accuracy of the content.

In block 804, the user-provided confidence input data and automatically-gathered confidence data are applied to a digital file and compared to thresholds. The thresholds may be predetermined, pre-set or pre-stored to correspond to actual or assumed alertness levels of a user or confidence levels in the quality of the content generated or modified by the user. In one embodiment, the user-provided input data and automatically-gathered confidence data are stored together in the digital file with the content, such as in the form of metadata.

In block 806, confidence ratings are generated for each segment or sub-section of the digital file. In other words, the content of the digital file is compared to the thresholds, and portions of the content that correspond to different threshold levels of the confidence levels are grouped in different segments or sub-sections. Each of the different segments or sub-sections is assigned a different confidence rating.

In block 808, the confidence ratings are displayed as confidence rating indicators with the content of the digital file. For example, the different segments or sub-sections may be displayed in different colors, with different outline colors or patterns, marked with different words, numbers or symbols, or by any other differentiating display.

Embodiments of the disclosure relate to systems, methods, apparatuses and computer program products for rating the confidence level or reliability of content within a digital file based on predetermined criteria and displaying rating indicators together with the content.

In one embodiment, predetermined criteria include at least one of a temporal criterion corresponding to when the content was created or modified, a biographical criterion corresponding to an identity of an author of, or contributor to, the content, and a content criterion corresponding to an inherent characteristic of the content.

In one embodiment, the predetermined criteria include at least one of a time that the content was created or modified and a period of time that the author of, or contributor to, the content was working on the digital file prior to creating or modifying the content. In another embodiment, the predetermined criteria include at least one of an experience level of the author or contributor and an alertness of the author or contributor. In yet another embodiment, the predetermined criteria include a complexity level of the content.

Embodiments include displaying different indicators corresponding to the different confidence ratings together with the different segments of content.

In one embodiment, data associated with the content of the digital file is analyzed based on the predetermined criteria. Analyzing that data may include analyzing user-provided data corresponding to at least one of biographical information of the user, an alertness of the user and an environment in which the user is working, and automatically-determined data that is automatically determined by the computer without user input.

In some embodiments, the content of the digital file is one of computer code, word processing content and computer-aided design content.

In an embodiment in which the content is computer code, each segment of content may correspond to a separate line of the computer code, and assigning a different confidence rating to the different segments of the content may include assigning a different confidence rating to separate lines of the computer code.

In an embodiment in which the content is word processing content of a word processing program, each segment of content may correspond to a separate group of words in the word processing content, and assigning a different confidence rating to the different segments of the content may include assigning a different confidence rating to separate groups of words in the word processing content.

In an embodiment in which the content is a graphical design of a computer-aided design program, assigning a different confidence rating to the different segments of the content may include assigning a different confidence rating to separate components in the graphical design.

In one embodiment, a method of rating content includes displaying a digital file and displaying the different segments in the digital file in different colors corresponding to the different confidence ratings of the different segments.

In embodiments of the disclosure, the confidence level or reliability of the content is based on criteria indicating that the content is error free. The criteria may be pre-programmed or pre-selected as corresponding to indicators of a user's experience or alertness, a complexity of content, whether content has been previously reviewed and confirmed as being error-free in the same or other digital files, or any other indicators. However, the criteria may not include, or may exclude, searching the subject matter of the content for errors. Instead, the criteria may include factors surrounding the creation or modification of the content other than comparisons of the subject matter with known "correct" subject matter.

For example, in an embodiment in which the content is source code, the criteria may not include, or may exclude, searching the code for extra or omitted typographical elements, words or symbols. Similarly, in an embodiment in which the content is word processing content, the criteria may not include, or may exclude, searching the word processing content for spelling or other typographical errors, grammatical errors, formatting errors, or any other errors. In an embodiment in which the content is graphical content, the criteria may not include, or may exclude, searching the graphical content for missing connections, elements of incorrect sizes, or any other graphical or design faults. In other words, comparing the content or data associated with the content to predetermined criteria does not include searching the content for faults. Instead, the reliability of the content, or the confidence level of the content, is determined based on data other than faults in the content to allow reviewers or other users to return to the content later to determine which portions of the content are the most likely to require review.

In another embodiment, although the predetermined criteria do not include searching for faults, the predetermined criteria may include determining a fault density. For example, if it is determined that a number of errors within a particular ten lines of source code is unusually high, or outside a predetermined threshold, then the block of ten lines may be designated as "low confidence" and may be marked as being eligible for further review. In other words, while the predetermined criteria do not include searching for actual faults in the content, the predetermined criteria may take into account a density of faults that have been determined to exist in segments of the content.

Technical effects and benefits of embodiments of the disclosure include providing indicators to users and reviewers of the potential for different content within a digital file to have different levels of quality, and different requirements for review and quality assurance. Accordingly, a reviewer of the content may reduce an overall time needed to review the content by spending less time reviewing content having a high confidence rating and spending less time reviewing content having a low confidence rating.

The terminology used herein is for the purpose of describing particular embodiments only and is not intended to be limiting of embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments have been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiments were chosen and described in order to best explain the principles and the practical application, and to enable others of ordinary skill in the art to understand the embodiments with various modifications as are suited to the particular use contemplated.

Computer program code for carrying out operations for aspects of the embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described above with reference to flowchart illustrations and/or schematic diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer implemented method for rating content of a digital file, the method comprising:
   analyzing, by a computer, data associated with content of the digital file based on predetermined criteria defining a confidence level in the content of the digital file, each predetermined criterion comprising a range of values and at least one threshold delineating a lower confidence level and a higher confidence level;
   assigning a different confidence rating to different segments of the content based on determining that the different segments correspond to different thresholds of the predetermined criteria; and
   associating, by the computer, the different confidence ratings to the different segments,
   wherein the content is one of computer code, word processing content and computer-aided design content, the computer code further comprising:
      each segment corresponds to a separate line of the computer code,
      assigning a different confidence rating to the different segments of the content includes assigning a different confidence rating to separate lines of the computer code, wherein:
         each segment corresponds to a separate group of words in the word processing content,
         assigning a different confidence rating to the different segments of the content includes assigning a different confidence rating to separate groups of words in the word processing content, and
      the computer-aided design content further comprises a graphical design of a computer-aided design program, wherein:
         each segment corresponds to a separate component of the graphical design, and
      assigning a different confidence rating to the different segments of the content includes assigning a different confidence to separate components in the graphical design.

2. The computer implemented method of claim 1, wherein the predetermined criteria include at least one of a temporal criterion corresponding to when the content was created or modified, a biographical criterion corresponding to an identity of an author of, or contributor to, the content, and a content criterion corresponding to an inherent characteristic of the content.

3. The computer implemented method of claim 2, wherein the predetermined criteria include at least one of a time that the content was created or modified and a period of time that the author of, or contributor to, the content was working on the digital file prior to creating or modifying the content.

4. The computer implemented method of claim 2, wherein the predetermined criteria include at least one of an experience level of the author or contributor and an alertness of the author or contributor.

5. The computer implemented method of claim 2, wherein the predetermined criteria include a complexity level of the content.

6. The computer implemented method of claim 1, further comprising:
   displaying different indicators corresponding to the different confidence ratings together with the different segments of content.

7. The computer implemented method of claim 1, wherein analyzing the data associated with the content of the digital file based on the predetermined criteria includes analyzing user-provided data corresponding to at least one of biographical information of the user, an alertness of the user and an environment in which the user is working, and automatically-determined data that is automatically determined by the computer without user input.

8. A computer program product for rating content of a digital file, the computer program product comprising:
   a tangible storage medium readable by a processing circuit and storing instructions for execution by the processing circuit for performing a method comprising:

analyzing, by the processing circuit, data associated with segments of content of the digital file based on predetermined criteria defining a confidence level in the content of the digital file, each predetermined criterion comprising a range of values and at least one threshold delineating a lower confidence level and a higher confidence level;

assigning a different confidence rating to different segments of the content based on determining that the different segments correspond to different thresholds of the predetermined criteria; and associating, by the processing circuit, the different confidence ratings to the different segments, wherein the content is one of computer code, word processing content and computer-aided design content, the computer code further comprising:

each segment corresponds to a separate line of the computer code, assigning a different confidence rating to the different segments of the content includes assigning a different confidence rating to separate lines of the computer code, wherein:

each segment corresponds to a separate group of words in the word processing content, assigning a different confidence rating to the different segments of the content includes assigning a different confidence rating to separate groups of words in the word processing content, and the computer-aided design content further comprises a graphical design of a computer-aided design program, wherein:

each segment corresponds to a separate component of the graphical design, and assigning a different confidence rating to the different segments of the content includes assigning a different confidence to separate components in the graphical design.

9. The computer program product of claim 8, wherein the content is the word processing content, each segment corresponds to a separate group of words in the word processing content, and assigning a different confidence rating to the different segments of the content includes assigning a different confidence rating to separate groups of words in the word processing content.

10. The computer program product of claim 8, wherein the content is the computer-aided design content comprising a graphical design of a computer-aided design program, each segment corresponds to a separate component of the graphical design, and assigning a different confidence rating to the different segments of the content includes assigning a different confidence rating to separate components in the graphical design.

11. The computer program product of claim 8, wherein the method further comprises:

displaying the digital file and displaying the different segments in the digital file in different colors corresponding to the different confidence ratings of the different segments.

12. The computer program product of claim 8, wherein analyzing the data associated with the content of the digital file based on the predetermined criteria includes analyzing user-provided data corresponding to at least one of biographical information of the user, an alertness of the user and an environment in which the user is working, and automatically-determined data that is automatically determined by the processor without user input.

13. The computer program product of claim 12, wherein the automatically-determined data include at least one of an experience level of an author of, or contributor to, the content, a time at which the content was modified or created and a duration of time that the author or contributor worked on the digital file prior to modifying or creating the content.

\* \* \* \* \*